(12) United States Patent
Huxford et al.

(10) Patent No.: US 12,744,482 B2
(45) Date of Patent: Sep. 22, 2026

(54) MOTOR CONTROL

(71) Applicant: ZF Automotive UK Limited, Solihull (GB)

(72) Inventors: Robert Huxford, Bromsgrove (GB); Christopher Dixon, Solihull (GB)

(73) Assignee: ZF AUTOMOTIVE UK LIMITED, Solihull (GB)

( * ) Notice: Subject to any disclaimer, the term of this patent is extended or adjusted under 35 U.S.C. 154(b) by 0 days.

(21) Appl. No.: 18/770,748

(22) Filed: Jul. 12, 2024

(65) Prior Publication Data

US 2025/0357876 A1 Nov. 20, 2025

(30) Foreign Application Priority Data

Jul. 14, 2023 (GB) ..................................... 2310832

(51) Int. Cl.
*H02P 21/22* (2016.01)
*H02P 21/13* (2006.01)
(Continued)

(52) U.S. Cl.
CPC .............. *H02P 21/22* (2016.02); *H02P 21/13* (2013.01); *H02P 21/18* (2016.02); *B62D 5/046* (2013.01)

(58) Field of Classification Search
CPC .. H02P 21/22; H02P 6/10; H02P 21/05; H02P 6/28; H02P 21/18; H02P 23/28;
(Continued)

(56) References Cited

U.S. PATENT DOCUMENTS 8,344,680 B2 * 1/2013 Kitanaka ................. H02P 21/22 318/632
8,604,735 B2 * 12/2013 Filka ................... H02P 21/0089 318/432
8,928,265 B2 * 1/2015 Qin ......................... H02P 21/50 318/400.34

FOREIGN PATENT DOCUMENTS

JP H1014274 A 1/1998
JP 2004072856 A 3/2004

OTHER PUBLICATIONS

Green (CN 114696592 A) Power Factor Correction System and Method (Year: 2022).*

(Continued)

*Primary Examiner* — Jorge L Carrasquillo
(74) *Attorney, Agent, or Firm* — Tarolli, Sundheim, Covell & Tummino LLP

(57) ABSTRACT

A motor circuit incorporated into a control system for a motor, in which the motor circuit comprises: a current determination stage arranged to generate a current demand signal in response to a torque demanded of the motor; a feedback loop comprising: a detector stage including a means for determining one or more operational values from the motor; and a current controller configured to calculate an error signal using one or more operational values from the detector stage and the current demand signal from the current determination stage; and a feedforward path comprising: a voltage controller configured to calculate a voltage demand signal from the current demand signal and one or more operational values from the motor, wherein the voltage controller comprises a first bandwidth filter, and wherein the current controller is configured to combine the error signal and the voltage demand signal to produce a signal for the motor.

8 Claims, 3 Drawing Sheets

(51) Int. Cl.
*H02P 21/18* (2016.01)
*B62D 5/04* (2006.01)

(58) Field of Classification Search
CPC ........ H02P 6/08; H02P 21/0003; H02P 21/13; H02P 27/08; B62D 5/046
USPC .............................. 318/400.02, 400.06, 619
See application file for complete search history.

(56) References Cited

OTHER PUBLICATIONS

Dinu (EP 3866329 A1) Motor Drive (Year: 2021).*
Dixon et al. (CN 108633322 A) Motor Control System (Year: 2018).*
Search report for corresponding application No. GB2310832.7, dated Jan. 15, 2024, 3 pages.

* cited by examiner

100
EDC Core
Current Demand Calculation
Current Controller
173
Drive Stage
Voltage
Vehicle
Speed
Force Low Bandwidth
105
108
181
143
182
142
Torque Demand
Current Demand
DQ Current Demand
iDQ*
Current Control (PI)
vDQ
Voltage Saturation Control
α β 2 UVW
Duty Ratio Calc.
PWM Edge Calc.
102
104
164
144
Voltage Controller
141
DQ 2 UVW
140
103
171
107
EDC MPS
Motor
Position & Velocity Calc.
iDQ
DQ 2 UVW
172
Current Measurement en1
162
106
161
110

MOTOR CONTROL

RELATED APPLICATIONS

This application claims priority from GB Patent Application 2310832.7, filed 14 Jul. 2023, the entirety of which is hereby incorporated herein by reference.

TECHNICAL FIELD

This invention relates to improvements in motor control circuits for use in electric power assisted steering systems, and in particular to control of multiple phase brushless motors in electric power assisted steering systems.

BACKGROUND

Control systems for PWM controlled electric motors, typically measure the current through the windings or phases of the motor using a current sensor. The measured currents are then converted into a stationary d-q frame and combined with a current demand signal, also in the d-q frame, indicative of the current that is demanded from the motor, to produce an error signal.

The demand current in an electric power assisted steering system is generated as a function of the torque demanded from the motor. The torque demand signal is a principally a measure of the amount of torque the motor should apply to the steering to help the driver to turn the wheel. The error signal represents the difference between the current that is demanded and the actual measured current. The error signal is fed to a controller which produces a set of voltage demand signals, also typically in the d-q frame, representative of the voltage to be applied to the motor that will best drive the error signal towards zero. The d-q voltages are then converted into PWM signals for the motor phases depending on which PWM strategy is used. The controller therefore acts to vary the phase voltages in order to try to constantly minimise the magnitude of the error signal thereby ensuring that the motor current is as close as possible to the demanded current. In this way, conventional controllers typically utilise a closed loop current control system.

SUMMARY

The applicant has appreciated that such closed loop current control systems are vulnerable to noise in the demand signal and in the motor phase current measurements from the sensor. In such systems, noise will be passed onto the error signal, and if left unchecked this will cause the current controller to react because it cannot discriminate between noise and genuine changes in error that should be tracked. In power assisted steering systems, this can cause unwanted acoustic noise and steering wheel vibrations known as ‘rumble’.

FIG. 1 shows an established motor control circuit configured to compensate for sensor noise by filtering the error signal of the feedback control loop. Reducing the bandwidth of the current response may make such a system less reactive to torque demand changes. The current invention seeks to ameliorate the issues associated with known motor control systems.

A first aspect provides a motor circuit incorporated into a control system for a motor, in which the motor circuit comprises:

- a current determination stage arranged to generate a current demand signal in response to a torque demanded of the motor;
- a feedback loop comprising:
  - a detector stage including a means for determining one or more operational values from the motor; and
  - a current controller configured to calculate an error signal using one or more operational values from the detector stage and the current demand signal from the current determination stage; and
- a feedforward path comprising:
  - a voltage controller configured to calculate a voltage demand signal from the current demand signal and one or more operational values from the motor,
- wherein the voltage controller comprises a first bandwidth filter, and
- wherein the current controller is configured to combine the error signal and the voltage demand signal to produce a signal for the motor.

The error signal may be an error current signal indicative of the difference between the current demand signal and the operating current of the motor measured by a motor sensor.

The motor control circuit may include one or more motor sensors configured to provide the one or more operational values of the motor input to the voltage controller. For example, the motor control circuit may include a first motor sensor operable to measure an operating current of the motor. The motor control circuit may include a second motor sensor operable to measure the velocity and/or position of the rotor relative to the stator.

The voltage controller may further comprise a steady state model of the motor arranged to receive the current demand signal. The steady state model of the motor may be configured to estimate unfiltered voltage demand signal as a function of the current demand signal. The unfiltered voltage demand signal may be calculated by the steady state mode to produce the demanded torque from the motor.

The voltage controller may be configured to feed output (s) from the steady state model (e.g., the unfiltered voltage demands) to the first bandwidth filter to form the voltage demand signal. The unfiltered voltage demand signal may be provided to the first bandwidth filter in the d-q reference frame.

The steady state model may comprise a mathematical model of the motor including characteristic parameters of the motor. The characteristic parameters of the motor may include any one or combination of: the resistance; d-axis inductance; and q-axis inductance.

The voltage controller may further comprise a back EMF compensation stage arranged to receive operational values from a motor sensor and calculate a back EMF signal that is fed to the steady state model to compensate the effect of induced back EMF. The operational values received from the motor sensor may include a motor velocity signal.

The voltage controller may comprise a filtered derivative stage arranged to receive at least part of the current demand signal. The voltage controller may be configured to feed outputs from the filtered derivative stage and the steady state model to the bandwidth filter to form the voltage demand signal. As such, the bandwidth filter may be configured to produce the voltage demand signal from the outputs of the filtered derivative stage and the steady state model.

The current demand signal may be expressed in the d-q axis frame, being formed of a q-axis component and a d-axis component. The filtered derivative stage may be arranged to receive the q-axis component of the current demand signal and not be arranged to receive the d-axis component of the current demand signal.

The first bandwidth filter may comprise a first low pass filter. The first low pass filter may have a cut-off frequency greater than or equal to 460 Hz, 480 Hz, 500 Hz, 550 Hz or 600 Hz. The first low pass filter may have a cut-off frequency less than 480 Hz, 500 Hz, 550 Hz or 600 Hz.

The current controller may include a second bandwidth filter arranged to filter the one or more operational values from the motor to produce filtered operational value(s). The one or more operational values from the motor that the second bandwidth filter arranged to filter may include any one or combination of: the speed of a vehicle; the velocity of a rotor of the motor relative to a stator of the motor; and/or the position of the rotor relative to the stator. The current controller may be configured to calculate the error signal using the filtered operational value(s) and the current demand signal.

The second bandwidth filter may comprise a second low pass filter. The second low pass filter may have a cut-off frequency less than or equal to 100 Hz, 80 Hz, 60 Hz, 50 Hz or 40 Hz. The second low pass filter may have a cut-off frequency greater than 40 Hz, 50 Hz, 60 Hz, or 80 Hz.

The cut-off frequency of a low pass filter may be defined as the frequency above which the output signal falls below 70.7% of the input signal.

BRIEF DESCRIPTION OF THE DRAWINGS

There will now be described, by way of example only, one embodiment of the present invention with reference to the accompanying drawings of which.

DESCRIPTION

Figure 1:
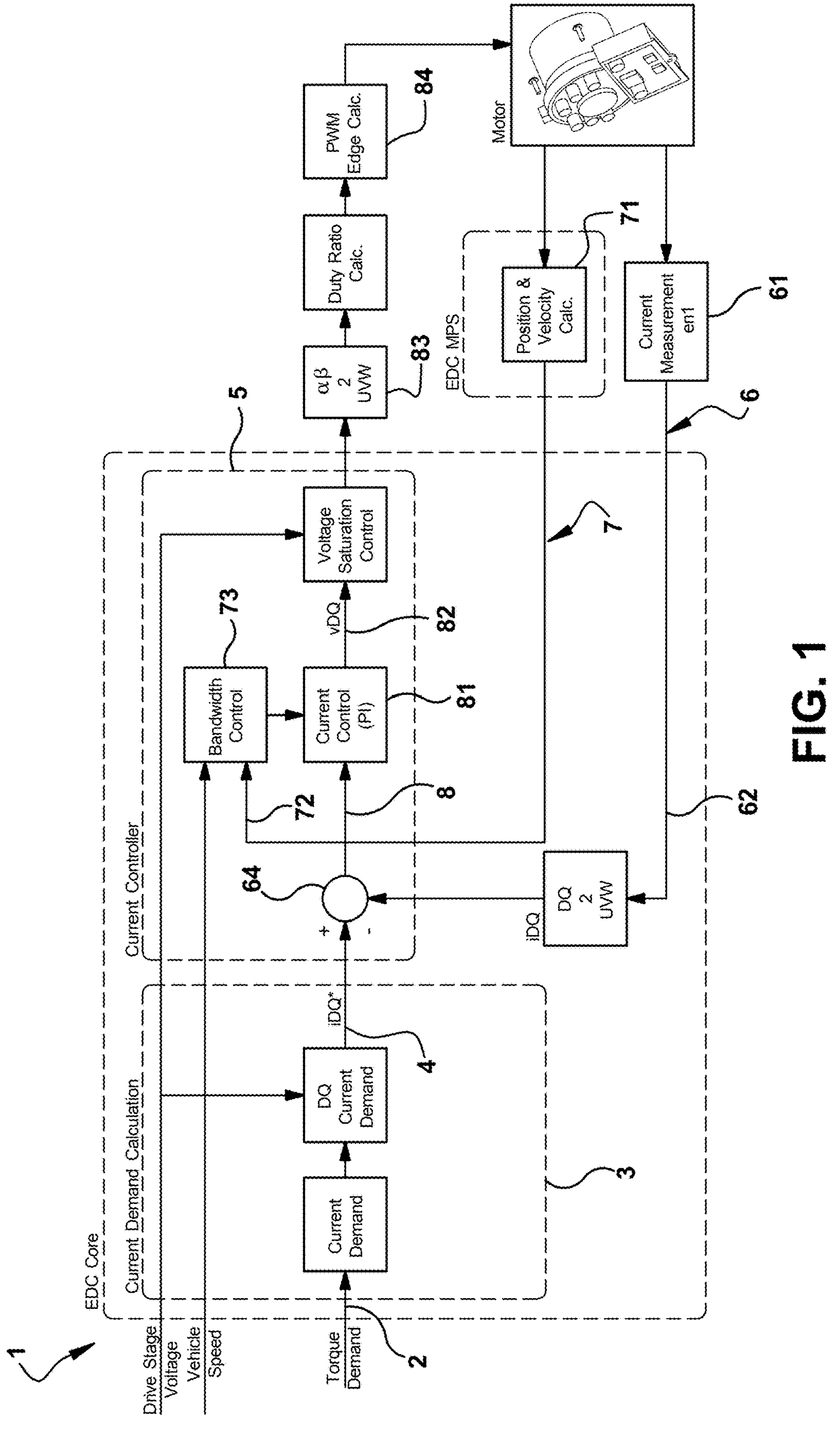
FIG. 1 is a block diagram showing a known motor control circuit.

FIG. 1 shows a block diagram showing a known motor control circuit 1 for a power assisted steering system. The known circuit 1 includes a torque sensor (not shown) that measures the torque in a steering column, and feeds this to a torque controller. The torque controller (not shown) calculates a torque demand signal 2 that is indicative of the torque to be produced by a motor of the power assisted steering system. The torque demand signal 2 is fed into a current determination stage 3 configured to convert the torque demand signal 2 into a current demand signal 4 in the fixed d-q frame, according to known characteristics of the motor. The current demand signal 4 is fed to a current controller 5 which causes the motor to operate and provide the demanded torque. This torque is applied by the motor to a steering wheel shaft, making it easier for a driver to turn the steering wheel.

The known circuit 1 includes two closed loop paths; a current controller loop 6, and a feedback controller loop 7. The current controller loop 6 includes a current sensor 61 which produces a current response signal 62 indicative of the actual current flowing in the motor. The current response signal 62 is then converted into the fixed d-q frame and fed into a subtractor 64 of the current controller 5 along with the current demand signal 4 to calculate a current error signal 8 indicative of the difference between the demanded d-q current and the actual measured d-q current. The current error signal 8 is then fed to the input of a proportional-integral (PI) controller stage 81 (of the current controller 5) that converts the current error signal 8 which is in the d-q frame into a voltage error signal 82 in the d-q frame, and this is then converted into three phase voltages UVW by a dq-UVW converter 83. The three phase voltages UVW are then converted into the required PWM voltage signals for each phase of the motor using the chosen SVM modulation technique by a PWM converter 84. In this way, the current controller loop 6 is configured to minimise error associated with the current demand signal 4 which ensures that the current in the motor phases matches the demanded current 4.

The feedback controller loop 7 includes a motor sensor 71 configured to provide one or more operational values 72 of the motor. For example, the motor sensor 71 may take measurements of the velocity and/or position of the rotor relative to the stator. These measurements can give rise to significant noise especially in the case where the motor sensor 71 comprises Hall sensors whose position measurements often include interference from external magnetic fields.

To minimise the effect of noise from the motor sensor 71, the operational values 72 are filtered using a bandwidth filter 73 before being input into the PI controller stage 81 of the current controller 5. The current controller within an electric power steering (EPS) system requires a high bandwidth to achieve the desired steering performance. The frequency of the bandwidth filter 73 is typically set at around 300-500 Hz to ensure fast response times required for an acceptable steer feel. Unfortunately, a portion of the spectrum of noise from the motor sensor 71 falls within the allowable frequencies of the bandwidth filter 73 that are required for adequate responsiveness. As such, for the known motor control circuit 1, a portion of noise from the motor sensor 71 is fed into the current controller 5 which produces irregularities in the voltage signals for each phase of the motor. In power assisted steering systems, this can manifest as unwanted acoustic noise and/or steering wheel vibrations which are collectively known as 'rumble'. The claimed invention seeks to ameliorate rumble associated with prior motor control circuits.

Figure 2:
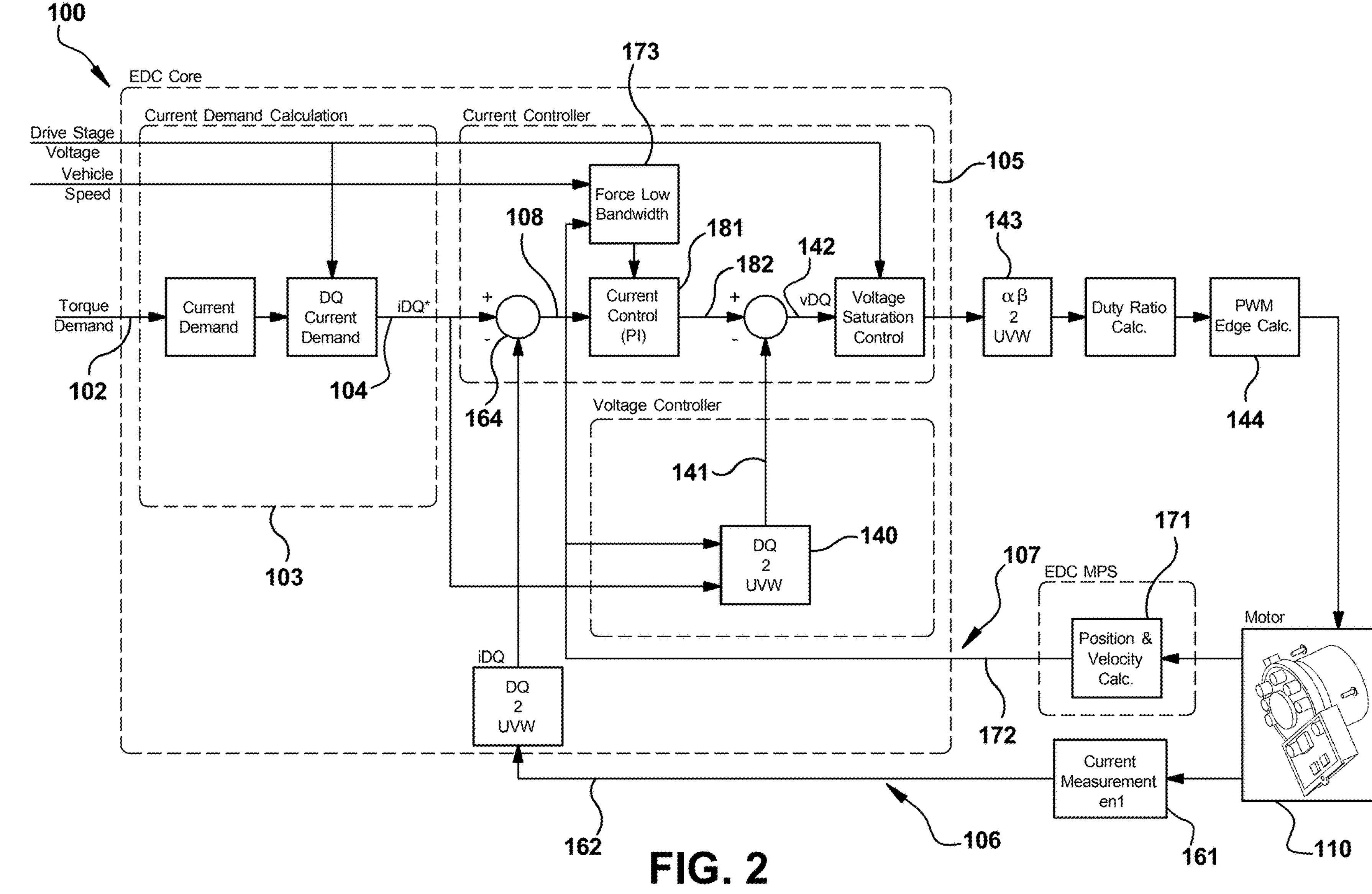
FIG. 2 is a block diagram showing a motor control circuit according to a first aspect of the disclosure.

FIG. 2 shows a motor control circuit 100 according to a first aspect of the disclosure. The motor control circuit 100 is incorporated into a control system for a motor 11. The control system for a motor 110 includes a torque sensor (not shown) that measures the torque in a steering column, and feeds this to a torque controller (not shown) of the control system. The torque controller calculates a torque demand signal 102 that is indicative of the torque to be produced by the motor 110. In this example, the motor 110 is incorporated into a power assisted steering system.

As in the previous example shown in FIG. 1, the motor control circuit 100 of FIG. 2 comprises a current determination stage 103 arranged to generate a current demand signal 104 in response to the torque demanded of the motor 110 (i.e., in response to torque demand signal 102). The current determination stage 103 is configured to convert the torque demand signal 102 into a current demand signal 104 in the fixed d-q frame, according to known characteristics of the motor 110.

In contrast to the previous example shown in FIG. 1, the motor control circuit 100, according to the first aspect to the disclosure, comprises a feedforward path including a voltage controller 140.

The voltage controller 140 receives the current demand signal 104 and is configured to calculate a voltage demand signal 141 indicative of the voltages to be supplied to the motor phases to achieve the torque demanded of the motor 110. The voltage demand signal 141 (in the d-q frame) is then used to produce three phase voltages UVW by a dq-UVW converter 143. The three phase voltages UVW are then converted into the required PWM voltage signals for each phase of the motor 110 using the chosen SVM modulation technique by a PWM converter 144. In the example wherein the motor control circuit 100, and the motor 110, forms part of a power assisted steering system, the PWM voltage signals cause the motor 110 to operate and provide the demanded torque to a steering wheel shaft, making it easier for a driver to turn the steering wheel.

The motor control circuit 100 also comprises two feedback loops; a current control loop 106, and a feedback control loop 107. The current control loop 106 includes a current controller 105 and a current sensor 161 which produces a current response signal 162 indicative of the actual current flowing in the motor 110. The current response signal 162 is then converted into the fixed d-q frame and fed into a subtractor 164 of the current controller 105 along with the current demand signal 104 to calculate a current error signal 108 indicative of the difference between the demanded d-q current and the actual measured d-q current. The current error signal 108 is then fed to the input of a proportional-integral (PI) controller stage 181 (of the current controller 105) that converts the current error signal 108 which is in the d-q frame into a voltage error signal 182 in the d-q frame.

The voltage error signal 182 from the controller 105 and the voltage demand signal 141 from the voltage controller 140 are fed to an adder circuit which combines these two signal to provide a modified demand signal 142. As shown in FIG. 2, it is the modified demand signal 142 (in the d-q frame) that is converted into the three phase voltages UVW by the dq-UVW converter 143 and ultimately cause the motor 110 to provide the demanded torque. In this way, motor control circuit 100 accounts for error between the demanded response and actual operational values recorded from the motor 110.

The feedback control loop 107 comprises a detector stage 171 including a means for determining one or more operational values from the motor 110. In this example, the means for determining one or more operational values 172 from the motor 110 is a motor position sensor 171 which is arranged to measure the relative velocity and position of a rotor and stator of the motor 110. The operational values 172 measured by the motor position sensor 171 are input into the voltage controller 140 and the PI controller stage 181 of the current controller 105. The voltage controller 140 is configured to calculate a voltage demand signal 141 from the current demand signal 104 and the operational values 172 of the motor 110.

The current controller 105 includes a bandwidth filter 173 which filters the signal representing operational values 172 of the motor 110 before they are input into the PI controller stage 181 of the current controller 105. In this way, the current controller 105 is able to eliminate any steady state errors or non-periodic errors associated with changing parameters over time (e.g., due to swelling of components with an increase in temperature or wear on components over time).

In this example, the bandwidth filter 173 is a low pass filter, specifically a 50 Hz low pass filter. This bandwidth is lower than the noise on the current response signal 162 from the current sensor 161. As such, the bandwidth filter 173 does not propagate this noise and so resultant rumble from this specific path is mitigated.

Figure 3:
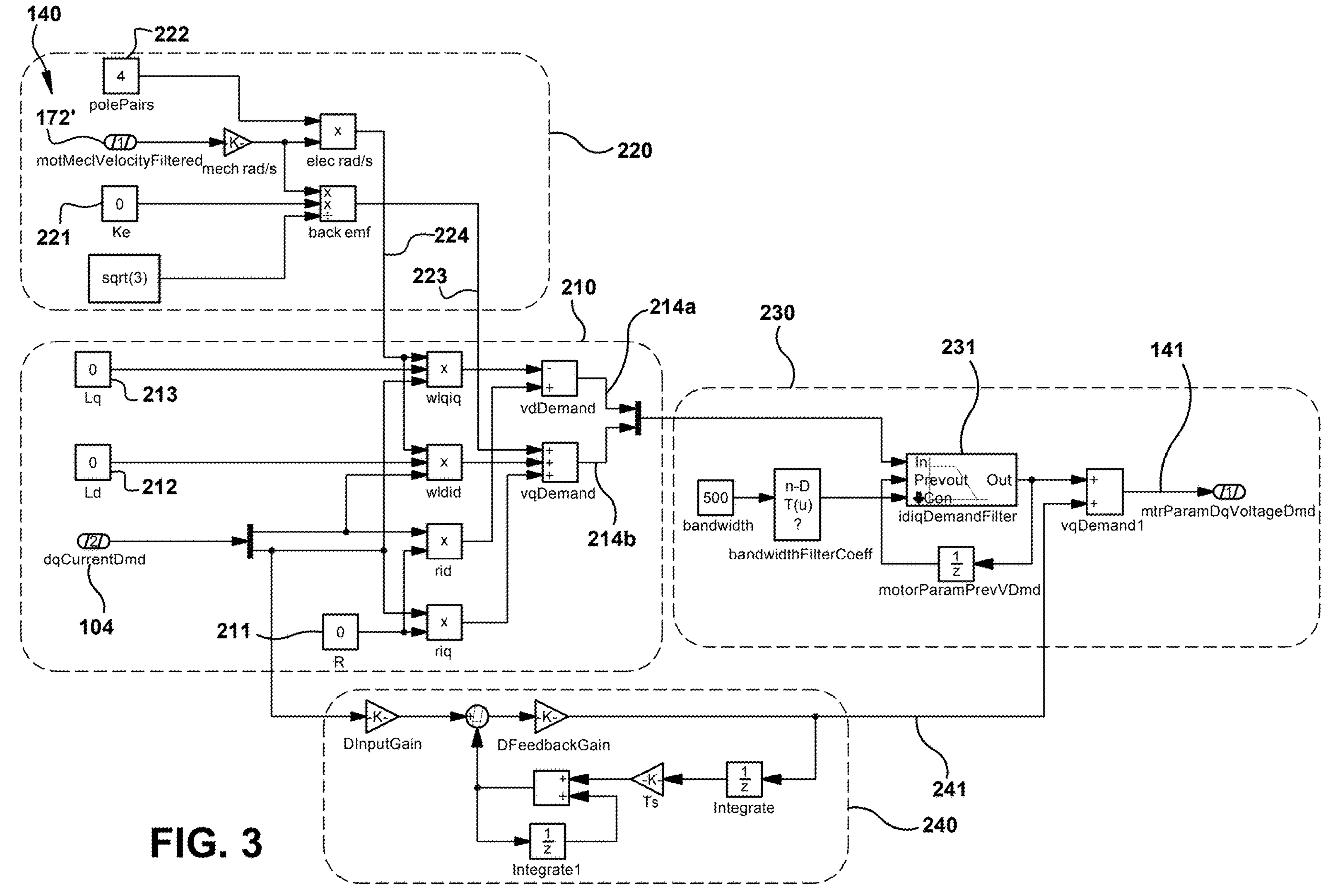
FIG. 3 is a block diagram showing part of the motor control circuit of FIG. 2.

FIG. 3 shows a block diagram representing the voltage controller 140 of the motor control circuit 100. As previously described, the voltage controller 140 forms part of the feedforward path for estimating voltage demands for the motor.

As shown in FIG. 3, the voltage controller 140 comprises a steady state model 210 (mathematical model of the motor) which is provided with characteristic parameters of the motor such as: resistance (R) 211; d-axis inductance (Ld) 212; q-axis inductance (Lq) 213; and motor velocity 224. The steady state model 210 is arranged to receive the current demand signal 104 and a signal indicative of the motor velocity 224, and estimate voltage demands **214*a*, 214*b***, in the d-q reference frame, to produce the demanded torque in the motor.

The voltage controller 140 also comprises a back emf compensation stage 220 which receives operational values from the motor sensor 171, specifically a motor velocity signal 172', and calculates a back EMF signal 223 that is fed to the steady state model 210 to compensate for resistance to rotation of the rotor induced by the back EMF. For The voltage controller 140 further comprises this purpose, the back emf compensation stage 220 is provided with a back EMF constant (Ke) 221 for the motor and number of pole pairs 122 for the motor.

The voltage demands **214*a*, 214*b* are fed through an output filter 230 to form the voltage demand signal 141. The output filter 230 includes a further bandwidth filter 231 which, in this example, is a 500 Hz low pass filter. The applicant has appreciated that a bandwidth of around 500 Hz is required to ensure adequate responsivity to torque demand changes necessary for an acceptable steer feel. As such, utilising a high frequency bandwidth filter (e.g., 500 Hz, 550 Hz or 600 Hz cut-off frequency) in the output filter 230 may beneficially ensure that the responsivity of the motor control circuit 100** remains at acceptable levels while filtering out higher frequency noise that would otherwise cause rumble.

The applicant has appreciated that rumble is typically only perceptible when the motor is stationary or rotating slowly. At these low motor speeds the phase currents are almost constant, and manifest as a rumble noise and vibrations of the steering wheel. In contrast, when the motor is rotating the phase currents are sinusoidal and the noise is masked as the currents are varying. At low motor speeds the d-axis current responsivity does not play a significant role in the responsivity of the motor control circuit 100 as a whole and so has been set aside when ensuring the required bandwidth for current response.

The voltage controller 140 includes a filtered derivative stage 240. The filtered derivative stage 240 provides a filtered derivative dynamic term 241 to the output filter 230 based on the q-axis component of the current demand signal 104. This filtered derivative dynamic term 241 may be used to achieve the required bandwidth for current response. The filtered derivative stage 240 may account for variation in the current demand signal 104 in a similar way to a proportional term in a closed loop feedback control loop such as the circuit 1 of FIG. 1. The applicant has appreciated that by eliminating the dependence of the derivative term on the current feedback signal, rumble may be ameliorated. The filtered derivative stage 240 may also beneficially effect the frequency response of the motor control system 100 as large transient demands are often required to overcome inductance in the motor and thereby achieve the required motor current rapidly.

In this way, the use of the feedforward path including the voltage controller 140 may mitigate or eliminate rumble while maintaining the required bandwidth for current response to allow acceptable steer feel and dynamic response.

Referring to FIGS. 2 and 3, the motor control system 100 may advantageously be used in an electric power steering system where the motor 110 applies an assistance torque to a steering shaft that assists a driver to turn a steering wheel. Ameliorating the propagation of noise within the motor control system 100 may diminish rumble thereby improving the steering feel as perceived by a trained driver.

The invention claimed is:

1. A motor circuit incorporated into a control system for a motor, in which the motor circuit comprises:

- a current determination stage arranged to generate a current demand signal in response to a torque demanded of the motor;
- a feedback loop comprising:
  - a detector stage including a means for determining one or more operational values from the motor; and
  - a current controller configured to calculate an error-signal using one or more operational values from the detector stage and the current demand signal from the current determination stage; and
- a feedforward path comprising:
  - a voltage controller configured to calculate a voltage demand signal from the current demand signal and one or more operational values from the motor, wherein the voltage controller comprises a first bandwidth filter, and wherein the current controller is configured to combine the error signal and the voltage demand signal to produce a-signal for the motor.

2. A motor circuit according to claim 1, wherein the voltage controller further comprises a steady state model of the motor arranged to receive the current demand signal, wherein the voltage controller is configured to feed output(s) from the steady state model to the first bandwidth filter to form the voltage demand signal.

3. A motor circuit according to claim 2, wherein the steady state model comprises a mathematical model of the motor including characteristic parameters of the motor, the characteristic parameters of the motor including any one or combination of: the resistance; d-axis inductance; q-axis inductance; and motor velocity.

4. A motor circuit according to claim 2, wherein the voltage controller further comprises a back EMF compensation stage arranged to receive operational values from the motor sensor and calculate a back EMF signal that is fed to the steady state model to compensate the effect of induced back EMF, optionally wherein the operational values received from the motor sensor include a motor velocity signal.

5. A motor circuit according to claim 1, wherein the voltage controller further comprises a filtered derivative stage arranged to receive at least part of the current demand signal, wherein the voltage controller is configured to feed outputs from the filtered derivative stage and the steady state model to the bandwidth filter to form the voltage demand signal.

6. A motor circuit according to claim 5, wherein the current demand signal is expressed in the d-q axis frame being formed of a q-axis component and a d-axis component, and wherein the filtered derivative stage is arranged to receive only the q-axis component of the current demand signal and is not arranged to receive the d-axis component of the current demand signal.

7. A motor circuit according to claim 1, wherein the first bandwidth filter comprises a first low pass filter with a cut-off frequency greater than or equal to 460 Hz, 480 Hz, 500 Hz, 550 Hz or 600 Hz.

8. A motor circuit according to claim 1, wherein the current controller includes a second bandwidth filter arranged to filter the one or more operational values from the motor to produce filtered operational value(s), wherein the current controller is configured to calculate the error signal using the filtered operational value(s) and the current demand signal, optionally wherein the second bandwidth filter is a low pass filter with a cut-off frequency less than or equal to 100 Hz, 80 Hz, 60 Hz, 50 Hz or 40 Hz.

* * * * *